United States Patent [19]

Nair et al.

[11] Patent Number: 5,230,790
[45] Date of Patent: Jul. 27, 1993

[54] HYDROCARBON CONVERSION PROCESSES USING MODIFIED ZEOLITE OMEGA

[75] Inventors: Vinayan Nair, East White Plains; Donald F. Best, Mahopac, both of N.Y.

[73] Assignee: UOP, Des Plaines, Ill.

[21] Appl. No.: 884,920

[22] Filed: May 18, 1992

Related U.S. Application Data

[60] Division of Ser. No. 795,911, Jan. 6, 1992, Pat. No. 5,139,761, which is a continuation of Ser. No. 628,830, Dec. 17, 1990, abandoned.

[51] Int. Cl.$^5$ .................... C10G 47/16; C10G 11/05; C07C 2/12; C07C 5/22
[52] U.S. Cl. .................................. 208/111; 208/120; 208/135; 208/213; 208/254 H; 585/467; 585/481; 585/666; 585/722; 585/739
[58] Field of Search ............... 208/14, 120, 135, 213, 208/254 H; 585/722, 481, 739, 666, 467

[56] References Cited

U.S. PATENT DOCUMENTS

| | | | |
|---|---|---|---|
| 3,493,519 | 2/1970 | Kerr et al. | 502/96 |
| 3,551,353 | 12/1970 | Chen et al. | 423/328 |
| 4,297,835 | 10/1981 | Lok et al. | 423/328 |
| 4,724,067 | 2/1988 | Rageiz et al. | 502/84 |
| 4,876,411 | 10/1989 | Bowes et al. | 502/86 |
| 4,891,200 | 1/1990 | Fajula et al. | 423/328 |
| 4,957,719 | 9/1990 | Taga et al. | 423/328 |
| 5,139,761 | 8/1992 | Nair et al. | 423/328 |

*Primary Examiner*—Asok Pal
*Attorney, Agent, or Firm*—Thomas K. McBride; Richard G. Miller

[57] ABSTRACT

Hydrocarbon conversion reactions are carried out over a catalyst composition containing forms of zeolite Omega synthesized by hydrothermal crystallization from reaction systems containing alkali metal cations and organic templating agents which have been modified by calcination in air, ion-exchange, steam calcination and treatment with a low-pH aqueous ammonium ion solution.

7 Claims, No Drawings

HYDROCARBON CONVERSION PROCESSES USING MODIFIED ZEOLITE OMEGA

RELATED APPLICATIONS

This application is a division of copending application Ser. No. 795,911, filed Jan. 6, 1992, now U.S. Pat. No. 5,139,761 which is in turn a continuation of application Ser. No. 628,830, filed Dec. 17, 1990, and now abandoned.

FIELD OF THE INVENTION

The present invention relates in general to hydrocarbon conversion reactions using a modified form of zeolite Omega and, more particularly, to the use of a form of zeolite Omega having an exceptionally high surface area, adsorption capacity for large molecules and improved catalytic activity. The starting zeolite Omega is calcined in air, ammonium ion exchanged, steamed at a temperature of at least 550° C. and then again subjected to an ammonium ion exchange using an exchange medium having a pH of less than 4.0, preferably in the range of about 0.5 to about 4.0.

BACKGROUND OF THE INVENTION

Zeolite Omega was first synthesized more than fifteen years ago. The synthesis techniques and characterization of the synthetic zeolite are reported in U.S. Pat. No. 4,241,036, issued Dec. 23, 1980, to E. M. Flanigen et al, the entire disclosure of which is incorporated by reference herein. Other synthesis processes have subsequently been developed in which the organic templating agent employed is a different organic amine, namely, ($\beta$-hydroxyethyl) trimethylammonium hydroxide (choline), choline chloride, pyrrolidone, or 1,4-diazobicyclo (2.2.2) octane (DABCO), the latter also called triethylenediamine (TED). These processes are disclosed, respectively, in U.S. Pat. No. 4,021,447 and U.S. Pat. No. 4,331,643, both issued to Rubin et al. See also U.S. Pat. No. 4,377,502 for additional synthesis procedures. Zeolite Omega is typically crystallized hydrothermally from a reaction mixture having a composition expressed in terms of mole ratios of oxides within the ranges

| | | |
|---|---|---|
| $(Na_2O + R_2O)/SiO_2$ | - | from about 0.1 to about 0.6 |
| $R_2O/(R_2O + Na_2O)$ | - | from $>0$ to about 0.6 |
| $SiO_2/Al_2O_3$ | - | from about 5 to about 30 |
| $H_2O(R_2O + Na_2O)$ | - | from about 10 to about 125 | wherein "R" represents the tetramethylammonium or other organic cation. Crystallization periods of from about 1 to 8 days at temperatures of from 90° C. to 180° C. are usually satisfactory. The as-synthesized zeolite Omega typically has a chemical composition (anhydrous basis) in terms of molar oxide ratios of $$(xR_2O + yNa_2O) : Al_2O_3 : 5 \text{ to } 20 \; SiO_2$$

wherein (x+y) has a value of from about 1.0 to 1.5 and x/y having a value usually in the range of about 0.35 to 0.60.

In addition to composition and in conjunction therewith, zeolite $\Omega$ can be identified and distinguished from other crystalline substances by its X-ray powder diffraction pattern, the data for which are set forth below in Table A. In obtaining the X-ray powder diffraction pattern, standard techniques were employed. The radiation was the $K_\alpha$ doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, and d(Å) observed, the interplanar spacing in Angstrom units corresponding to the recorded lines were determined. In Table A, the more significant interplanar spacings, i.e., the d(Å) values which characterize and distinguish zeolite $\Omega$ from other zeolite species and which must be present in the X-ray powder diffraction pattern of the zeolite $\Omega$ composition of the present invention, are set forth. The relative intensities of the lines are expressed as VS (very strong), S (strong), MS (medium strong) and M (medium).

TABLE A

| d, (Å) | Relative Intensity |
|---|---|
| 9.1 ± 0.2 | VS |
| 7.9 ± 0.2 | M |
| 6.9 ± 0.2 | M-S |
| 5.95 ± 0.1 | M-S |
| 4.69 ± 0.1 | M-S |
| 3.79 ± 0.1 | S |
| 3.62 ± 0.05 | M-S |
| 3.51 ± 0.05 | M-S |
| 3.14 ± 0.05 | M-S |
| 3.08 ± 0.05 | M |
| 3.03 ± 0.05 | M |
| 2.92 ± 0.05 | M-S |

Thus, zeolite $\Omega$ can be defined as a synthetic crystalline aluminosilicate having an X-ray powder diffraction pattern characterized by at least those interplanar spacing values set forth in Table A and having the stoichiometric compositions as set forth hereinbefore. The X-ray data given below in Table B are for a typical example of zeolite $\Omega$ prepared in the sodium, TMA system.

TABLE B

| d, (Å) | Intensity |
|---|---|
| 15.95 | 20 |
| 9.09 | 86 |
| 7.87 | 21 |
| 6.86 | 27 |
| 5.94 | 32 |
| 5.47 | 6 |
| 5.25 } * | 8 |
| 5.19 } | |
| 4.695 | 32 |
| 3.909 | 11 |
| 3.794 | 58 |
| 3.708 | 30 |
| 3.620 | 25 |
| 3.516 | 53 |
| 3.456 | 20 |
| 3.13 | 38 |
| 3.074 } * | 21 |
| 3.02 } | |
| 2.911 | 36 |
| 2.640 | 6 |
| 2.488 | 6 |
| 2.342 | 17 |
| 2.272 | 6 |
| 2.139 | 5 |
| 2.031 | 17 |
| 1.978 | 5 |
| 1.909 | 10 |
| 1.748 | 6 |

* = doublet

As synthesized, the crystallites of zeolite Omega are usually quite small and are recovered as anhedral to spherical growth agglomerates from about 0.2 to several microns in size. The acid stability of the crystals is relatively high, producing a buffering effect at a value of about 1.6 when titrated with a 0.25N aqueous solution of HCl. By this test zeolite Omega is more acid-stable than zeolite Y, less acid stable than mordenite, and essentially the same as the natural zeolites erionite, clinoptilolite and chabazite.

The pore diameters of the zeolite are quite large, at least about 8 Angstroms, as evidenced by the adsorption of more than 15 weight percent of $(C_4F_9)_3N$ at 50° C. and a pressure of 0.7 mm. Hg in each of the sodium, calcium, potassium and ammonium cation forms after calcination to remove the organic ions and/or compounds from the internal cavities. The organic species are not capable of being removed as such through the pore system, because they are intercalated in the structural gmelinite cages which are arranged in the crystal lattice to form the large pores along the crystallographic "c" axis.

The basic chemical and physical properties of zeolite Omega as indicated by the aforementioned evaluations suggest, a priori, that it would have considerable commercial capabilities as a catalyst or catalyst base in many of the hydrocarbon conversion processes which employ other large-pore zeolites such as zeolite Y. This potential has not been realized, however, due in large part to an apparent lack of consistency in the acidic and adsorptive properties observed in different synthesis batches of the zeolite.

A particularly important and significantly variable property is the thermal stability of the as-synthesized zeolite Omega. As reported by Weeks et al in JCS Farad. Trans. 1, 72 (1976), zeolite Omega in the sodium or ammonium cation form is either destroyed or undergoes a considerable decrease in crystallinity by calcination in air at 600° C., a phenomenon attributed by the authors to the loss of $TMA^+$ ions at about that temperature. Others analyzed samples is, in part at least, responsible for the relatively low thermal stability. On the other hand, in U.S. Pat. No. 4,241,036, Flanigen et al report that zeolite Omega is stable up to about 800° C. when heated in air or vacuum and that when heated for 17 hours at temperatures within the range of 300° C. to 750° C., the zeolite undergoes no appreciable loss in X-ray crystallinity, but that at 400° C. there is an appreciable loss of $TMA^+$ cations by thermal decomposition. It would appear from the foregoing that one or more aspects of the synthesis procedure, as yet unidentified, can have a marked effect upon the physical and/or chemical properties of zeolite Ω, and that these differences account, at least in part, for the somewhat erratic catalytic properties noted by prior investigators in zeolite Ω compositions which, by virtue of their provenance, would be expected to be nearly identical.

In U.S. Pat. No. 4,780,436, issued Oct. 25, 1988, to Raatz et al, this characteristic instability of zeolite Ω is discussed and a stabilization and dealumination procedure is proposed which converts the as-synthesized form of the zeolite to a form with more reproducible catalytic behavior. The treatment proposed by Raatz et al is a three-step procedure which comprises:

(a) a first step of subjecting the synthetic zeolite to a treatment for removing the major part of the $TMA^+$ cations, while decreasing the alkali metal cations to less than 0.5 percent by weight;

(b) a second step of subjecting the product of the first step to at least one calcination in air, steam or a mixture of air and steam at a temperature of from 400° C. to 900° C.; and (c) acid etching the product of the second step with an inorganic acid such as HCl or an organic acid such as acetic acid.

The procedure is alleged to cause some shrinkage of the unit cell constants, $a_o$ and $c_o$, to below 1.814A and 0.759A, respectively, to increase the nitrogen adsorption capacity and to create a mesopore structure which corresponds to about 5 to 50 percent of the combined mesopore and micropore volume. The catalytic acidity of the zeolite is also said to be improved.

SUMMARY OF THE INVENTION

In accordance with the present invention there is provided a novel modified form of zeolite Omega having adsorption properties and catalytic activity significantly different from those possessed by any of the known prior art forms of zeolite Omega. The method for preparing these unique compositions is also novel and is a part of the invention.

The zeolite composition of the invention has a chemical composition in terms of molar oxide ratios in the anhydrous state of $$xM_{2/n}O : Al_2O_3 : ySiO_2$$

wherein "M" represents a cation having the valence "n," "x" has a value of from zero to about 1.2, "y" has a value of at least 7, preferably greater than 10, an X-ray diffraction pattern containing at least the following d-spacings

| d, (Å) | Relative Intensity |
|---|---|
| 9.1 ± 0.2 | VS |
| 7.9 ± 0.2 | M |
| 6.9 ± 0.2 | M-S |
| 5.95 ± 0.1 | M-S |
| 4.69 ± 0.1 | M-S |
| 3.79 ± 0.1 | S |
| 3.62 ± 0.05 | M-S |
| 3.51 ± 0.05 | M-MS |
| 3.14 ± 0.05 | M-S |
| 3.08 ± 0.05 | M |
| 3.03 ± 0.05 | M |
| 2.92 ± 0.05 | M-S | an adsorption capacity for $SF_6$ of at least 6.0 weight percent when measured at 22° C. and an $SF_6$ pressure of 400 mm. Hg, an adsorption capacity for oxygen of at least 20 weight percent when measured at −183° C. and an oxygen pressure of 100 mm. Hg, and a surface area (B.E.T.) of at least 500 m²/gram. The zeolite composition preferably has a butane Cracking Activity, $K_a$, of at least 160.

In preparing the novel composition, the procedure comprises the steps of (a) providing an as-synthesized zeolite Omega starting material containing alkali metal and organic cations, calcining the starting composition, preferably in air at a temperature in the range of about 400° C. to 600° C. to thermally decompose the organic cations;

(b) contacting the calcined product of step (a) with an aqueous solution of non-metallic cations under cation exchange conditions to lower the alkali metal cation content to below 0.1 equivalent percent;
(c) calcining the ion-exchanged product of step (b) in contact with at least 3 psia steam at a temperature of from about 400° C. to 800° C., preferably from 500 C to 575° C., preferably for a period of at least about 2 hours; and thereafter
(d) contacting the steamed product of step (c) with a sufficient amount of an aqueous solution of ammonium ions having a pH of less than about 4.0 and for a sufficient time to increase the bulk $Si/Al_2$ ratio of the zeolite composition with respect to the starting composition of step (a) and to a value of at least 7.0.

DETAILED DESCRIPTION OF THE INVENTION

The starting zeolite used to prepare the novel compositions of the present invention can be any zeolite Omega prepared in accordance with the teachings of the prior art such as the Flanigen et al U.S. Pat. No. 4,241,036. The zeolite is sometimes denominated as ZSM-4, and is topologically related to the mineral mazzite. Another synthetic zeolite species knows as LZ-202 is also topologically related to zeolite Omega, but is prepared in the absence of an organic templating agent. See U.S. Pat. No. 4,840,779 issued to T. R. Cannan in this regard. Since the inherent thermal instability of activated zeolite Omega is thought to be related to initial presence and subsequent removal of the organic cations, neither mazzite nor LZ-202 is believed to benefit from the treatment in accordance with the present invention. Of the starting zeolite Omega compositions containing both alkali metal and organic cations, those in which the framework $Si/Al_2$ molar ratio is within the range of 5-12 are preferably employed.

In the initial step of the preparative process the removal of the $TM^+$ and/or other organic templating cations is accomplished by calcination at a temperature of at least 400° C., and preferably between 500° C. and 600° C. While essentially any inert atmosphere can be used in the calcinations, i.e., nitrogen, helium, hydrogen and the like, it is advantageous to utilize an atmosphere containing oxygen in sufficient amount to convert the non-volatile carbon residue of the decomposed organic template to CO or $CO_2$ so that it can be readily removed from the zeolite pore system. Air is a convenient oxidative medium either per se or supplemented with additional oxygen. Water vapor need not be entirely excluded from the calcination atmosphere, but should be limited to partial pressures of less than about 1.5 psia.

Following the calcination to remove the organic cations, the zeolite is ion-exchanged with non-metallic cations to reduce the alkali metal content of the zeolite to less than about 0.1 equivalent percent. The term non-metallic cations is intended to mean hydrogen or ammonium cations or precursors of hydrogen or ammonium cations. It is highly preferred that the cations substituted for the alkali metal cations consist of, or at least comprise, ammonium cations. In general, the non-metallic nitrogen-containing cations which are precursors of hydrogen or ammonium cations, such as the tetraalkylammonium and other quaternary ammonium compounds, are relatively large ionic species which have difficulty in rapidly diffusing through the pore system of the zeolite to contact the alkali metal cations. In addition, these organic species are in general quite expensive and their use needlessly increases the costs of the process. Hydrogen cations introduced by ion-exchange with an inorganic or organic acid medium are entirely suitable for the practice of the preparative procedure, but it is sometimes difficult to obtain the necessary replacement of alkali metal cations without damage to the zeolite crystal structure. Accordingly, the ion exchange is carried out in any manner conventional in the art, preferably with an aqueous solution of an ammonium salt such as $NH_4Cl$, $NH_4NO_3$ or $(NH_4)_2SO_4$ at a temperature of from about 25° C. to 100° C., preferably about 90° C. Advantageously multiple-step procedures are used in which the zeolite is contacted with a series of fresh ion-exchange solutions which prevents the creation of an equilibrium condition from developing as exchanged alkali metal ions from the zeolite become more concentrated in the exchange solution. After the alkali metal cation content of the zeolite has been reduced to below 0.1 weight percent, the zeolite is washed with water to remove any occluded salt.

The low-alkali metal zeolite is then steamed at a temperature of from 500° C. to 900° C., preferably from 550° C.-750° C., for a period of about 0.5 to about 2 hours, depending somewhat upon the temperature, with at least 3.0 psia steam, preferably 100% steam. The steaming procedure appears to remove aluminum atoms from the crystal lattice, but the mechanism has not been fully elucidated. The available literature on the subject indicates that the dealumination of zeolite Omega does not closely parallel the much more thoroughly investigated dealumination mechanism of zeolite Y using steam. Moreover, the experimental data presented hereinafter provide added evidence that the dealuminations of zeolite Omega and zeolite Y do not occur in the same or similar manner. Regardless of the mechanism, the steaming should be continued until there is at least some reduction in the $a_o$ unit cell constant and, preferably, to not more than about 18.21 Angstroms.

The steamed zeolite product is then contacted with a low-pH aqueous solution of ammonium ions. The concentration of the ammonium ion solution is not a critical factor, but is generally in the range of 100 to 300 gram ions/liter of $NH_4^+$. The amount of ammonium ion solution relative to the zeolite composition is also not critical, but solutions containing from 100 to 200 gram ions of $NH_4^+$ per 100 grams of zeolite (anhydrous basis) have been found to be suitable. As in the case of the ion-exchange of step (b) of the preparative process, supra, multiple, preferably three, contacts of the zeolite with fresh solutions of ammonium ions are more effective than one step treatments. The ammonium ions can be provided by any of the common ammonium salts such as $NH_4Cl$ and $NH_4NO_3$, the latter being preferred. It is a critical matter that the pH of the $NH_4^+$ ion solution be not greater than 4.0 and is preferably in the range of 3.0 to 4.0. The pH can readily be adjusted to the proper range by the addition of a mineral acid such as nitric or hydrochloric acid. The temperature of contact of the zeolite and the $NH_4^+$ solution is generally in the range of 25° C. to 100° C., preferably about 90° C. Optimum conditions of contact time, temperature and concentration of ammonium ions are readily determined for each zeolite Omega starting material by periodic monitoring of the physical and chemical properties of the zeolite.

The process of preparation and the unique properties of the resulting modified zeolite Omega are illustrated by the following examples. In making the surface area, adsorption capacity and Butane Cracking Activity measurements referred to in the Examples, the following procedures were used:

(a) Surface Area - Determined utilizing the Brunauer-Emmett-Teller (BET) theory of multilayer adsorption. The surface area is determined by measuring the volume of nitrogen gas adsorbed at liquid nitrogen temperatures. The single point analysis is used. Sample preparation is accomplished by heating the sample to 400° C. and evacuating to a pressure of less than 10 um for 16 hours.

The surface area is calculated from the experimental data according to the equation:

*Surface area* $(m^2/g = 4.35(1/S + I)$ wherein $S$ = Slope of $P/V_a(P_o - P)$ vs $P/P_o = P_o/V_a(P_o - P)$ In single point analyses, the value of $I$ is zero since the intercept passes through the origin. $V_a$ represents the volume of nitrogen adsorbed. The BET surface area determination is well known in the art.

(b) $SF_6$ Adsorption Capacity—a conventional McBain-Bakr adsorption apparatus was employed. The test sample was activated at 400° C. overnight under vacuum of $10^{-5}$ torr and then cooled to 22° C. $SF_6$ was introduced into the apparatus in contact with the zeolite sample at a pressure of 400 mm. Hg and at a temperature of 22° C. The weight difference between the starting zeolite and the zeolite in contact with the $SF_6$ after 2 hours was calculated and reported in terms of weight percent, anhydrous basis of the zeolite. The anhydrous weight of zeolite is determined after calcination at 400° C. for 16 hours.

(c) Oxygen Adsorption Capacity—Determined in the same manner as in the case of $SF_6$, supra, except the oxygen pressure was 100 mm Hg and the temperature was $-183°$ C.

(d) Butane Cracking Activity—The procedure described in detail by H. Rastelli et al in the Canadian Journal of Chemical Engineering, 60, pgs. 44–49 (1982), incorporated by reference herein, was employed.

EXAMPLE 1

Synthesis of zeolite Omega

A zeolite $\Omega$ sample was prepared hydrothermally from a reaction mixture having the following composition in terms of mole ratios of oxides:

8 $SiO_2$ : $Al_2O_3$ : 0.25$(TMA)_2O$ : 5 $Na_2O$ : 140 $H_2O$

In the preparation of the reaction mixture 15.7 pounds of flake NaOH (98%) were dissolved in 34.4 pounds of water. To this solution were added simultaneously 127.4 pounds of sodium silicate (29.1 weight percent $SiO_2$, 9.4 weight percent $Na_2O$, 61.5 weight percent $H_2O$) and 94.3 pounds of alum (8.34 weight percent $Al_2O_3$, 24.07 weight percent $H_2SO_4$, 67.59 weight percent $H_2O$). After completion of the addition, a one-liter portion of the slurry was removed and combined with 5.94 pounds of tetramethylammonium bromide. The TMABr-containing composition was then returned to the bulk of the slurry to form the complete reaction mixture. Digestion and crystallization was carried out at 125° C. for 45 hours. The crystalline zeolite $\Omega$ product was recovered by filtration and was washed with water until the pH of the wash water was below 11. The bulk $Si/Al_2$ ratio of the product was 6.8 and the values for the unit cell parameters $a_o$ and $c_o$ were 18.21 and 7.63, respectively.

EXAMPLE 2

(a) A portion of the zeolite Omega prepared in Example 1 was dried in air at 100° C. and then calcined in air at a temperature of 540° C. for 1.5 hours. The surface area, adsorption capacity for $SF_6$ and $O_2$ and the Butane Cracking Activity for this calcined composition were determined. The values are reported in Table C, below.

(b) A portion of the zeolite Omega prepared in Example 1 was calcined as in part (a) supra and then subjected to ammonium ion-exchange using an aqueous solution of ammonium nitrate. The exchange was carried out in three steps, each using 6.5 ml. of fresh ammonium nitrate solution per gram of zeolite. The exchanges were carried out at 93° C. and contact between zeolite and exchange medium was maintained for 60 minutes for each of the three steps. The exchanged product was washed with distilled water and dried in air at 100° C. Surface area, butane cracking activity and $SF_6$ and $O_2$ adsorption capacities were determined. The results are reported in Table C, below.

(c) A portion of the same calcined zeolite Omega as employed in part (b) supra was subjected to two ammonium ion exchanges using an aqueous ammonium nitrate solution adjusted with nitric acid to an initial pH of 0.85. Each contact between zeolite and solution was for a For each gram of zeolite, 6.5 ml. of ammonium nitrate solution was employed in each of the two steps. The pH of the ion-exchange medium in contact with the zeolite was at all times maintained at about 0.85 by continuous addition of nitric acid. The results of the analytical procedures performed on the product zeolite are reported in Table C, below.

(d) In a process embodiment of the present invention, a sample of the same zeolite Omega sample as used in the foregoing parts of this example and ion-exchange as reported in part (b) was steamed for 2 hours at 550° C. using 100% steam. The steamed product was then again subjected to an ammonium ion exchange using the same procedure and ammonium nitrate solution (pH=0.85) as in part (c). The analytical results for this composition are reported in Table C, below.

EXAMPLE 3

Comparison Example

Using the same zeolite Omega starting material, the same calcination in air, the same initial ammonium ion exchange procedure and the same steaming procedure at 550° C. as in part (d) of Example 2, supra, the product zeolites of those treatments were contacted and washed with a 6N aqueous HCl solution using about 2700 ml. of the acid per 100 grams of zeolite. Contact of the zeolite with the acid was maintained for about one hour at a temperature of 93° C. The acid-treated product was analyzed for surface area, $SF_6$ and $O_2$ adsorption and Butane Cracking Activity. The results are set forth in Table C, below.

EXAMPLE 4

Comparison Example

The procedure of part (d) of Example 2, supra, was repeated using the same starting zeolite Omega and the same ammonium ion-exchange media, but conducting the steaming step at 400° C. instead of 500° C. as in the prior example. The analytical results obtained for the product zeolite are set forth in Table C, below.

EXAMPLE 5

Comparison Example

The procedure of Example 3, supra, was repeated using the same starting zeolite Omega, the same ion-exchange medium and the same HCl solution, but conducting the steaming step at 400° C. instead of 550° C. as in the prior example. The analytical results obtained for the product zeolite are set forth in Table C below.

EXAMPLE 6

Comparison Example

In a particular embodiment of the process of the present invention, the procedure of Example 2 (d) was repeated except that the steaming temperature was increased to 700° C. The analytical results for the product are set forth in Table C below.

EXAMPLE 7

Comparison Example

The procedure of Example 3, supra, was repeated using the same starting zeolite Omega, the same ion-exchange medium and the same HCl solution, but conducting the steaming step at 700° C. instead of 550° C. as in the prior example. The analytical results obtained for the product zeolite are set forth in Table C, below.

ion exchange with an ammonium ion solution of normal, i.e., unadjusted, pH changes the bulk $Si/Al_2$ ratio of the zeolite. The conventional ammonium ion exchange of the air calcined form of the zeolite does show an increase in surface area, oxygen adsorption capacity and Butane Cracking Activity, the latter being a general indicator for zeolitic acidity. The adsorption capacity for $SF_6$, however, is decreased by the conventional high pH ammonium exchange treatment.

In the case of zeolite Omega at least, the implications of the capacity to adsorb $SF_6$ are significantly different from those arising from the capacity to adsorb oxygen. The kinetic diameter, calculated from the minimum equilibrium cross-sectional diameter, of $SF_6$ is 5.5 Angstroms and for $O_2$ the value is 3.46. In view of the fact that all species of hydrocarbon molecules have kinetic diameter larger than 3.46, not all of the internal surface area of the zeolite crystal which can be contacted by oxygen molecules can be contacted by adsorbed hydrocarbon species. The availability of internal surface area available to $SF_6$, however, is effectively available to a considerable number of hydrocarbon and other organic molecular species. Accordingly, the catalytic effectiveness of zeolite Omega crystals which have high $SF_6$ adsorptive capacity is potentially much higher than for those forms of the zeolite having low $SF_6$ capacity. As a corollary, oxygen adsorptive capacity alone is not a good measure of catalytic effectiveness.

Thus, the effect of a conventional ammonium ion exchange in lowering the $SF_6$ capacity of zeolite Omega as shown in Example 2(b) tends to impair the catalytic activity of the composition, although the overall improvement in the surface area and in the oxygen capacity, and the removal of sodium cations results in an improvement in the Butane Cracking Activity of the composition of Example 2(b) compared with that of Example 2(a).

TABLE C

| Example # | S.A. $m^2/g$ | $SF_6$ Capacity (Wt. %) | $O_2$ Capacity (Wt. %) | Butane Cracking Activity $(K_a)$ | Bulk $SiO_2/Al_2O_3$ | Framework IR, $cm^{-1}$ Symm | Framework IR, $cm^{-1}$ Asymm |
|---|---|---|---|---|---|---|---|
| 1 | — | — | — | — | 6.8 | 815 | 1038 |
| 2(a) | 148 | 2.9 | 13.1 | 0.083 | 6.8 | 821 | 1046 |
| 2(b) | 338 | 1.9 | 19.3 | 43 | 6.8 | 816 | 1042 |
| 2(c) | 261 | 1.7 | 12.9 | 0.12 | 24.3 | 802 | 1068 |
| 2(d) | 513 | 7.6 | 20.7 | 237 | 11.9 | 833 | 1070 |
| 3 | 230 | 0.58 | 11.2 | 0.19 | 654 | 942 | 1087 |
| 4 | 396 | 4.1 | 18.9 | 33.26 | 9.6 | 818 | 1041 |
| 5 | 250 | 0.64 | 11.9 | 0 | 911 | 942 | 1090 |
| 6 | 550 | 8.5 | 22.0 | 189 | 31 | 848 | 1083 |
| 7 | 558 | 8.8 | 22.2 | 96 | 71 | 849 | 1084 |

| Example # | X-ray Crystallinity* | Unit Cell Parameters, Angstroms $a_o$ | Unit Cell Parameters, Angstroms $c_o$ | $N_2$ Adsorption, Wt. %** | $H_2O$ Adsorption Wt. % |
|---|---|---|---|---|---|
| 1 | 67956 | 18.21 | 7.63 | — | — |
| 2(a) | 51414 | | | 4.0 | 15.5 |
| 2(b) | 55444 | | | 10.3 | 16.8 |
| 2(c) | 19172 | | | 8.0 | 6.4 |
| 2(d) | 45394 | 18.21 | 7.59 | 13.3 | 15.1 |
| 3 | No peaks | Amorphous | | 7.3 | 5.7 |
| 4 | 45391 | | | 11.3 | 13.9 |
| 5 | No peaks | | | 7.3 | 8.8 |
| 6 | 45811 | 17.99 | 7.51 | 16.5 | 10.9 |
| 7 | 43232 | 18.06 | 7.52 | 16.7 | 10.3 |

*Sum of five selected peaks (at d spacings 9.1 ± 0.2, 6.9 ± 0.2, 3.79 ± 0.1, 3.62 ± 0.05, 2.92 ± 0.05)
**Measured at $P/P_o = 0.19$ The data of Table C reveal a number of unexpected phenomena. Comparisons among Examples 1, 2(a) and 2(b) show that neither calcination in air at 540° C. nor The data for Example 2(c) show that there is a significant difference between the ion-exchange of the air calcined zeolite Omega using a conventional ammonium salt solution and one in which the pH has been adjusted to below 4.0. Compared with Example 2(b), the Example 2(c) composition is lower in B.E.T. surface area, $SF_6$ capacity, oxygen capacity and Butane Cracking Activity. Only the bulk $Si/Al_2$ ratio is increased. This clearly demonstrates that aluminum removal alone does not necessarily result in an improved composition.

EXAMPLE 8

In determining the Butane Cracking Activity ($K_\alpha$) of the modified zeolite Ω composition of Example 2(d), above, the composition was activated in flowing helium at 500° C. for one hour, and the cracking reaction carried out at 500° C. also. The results of the analysis of the cracked product effluent from the reactor after 10 minutes on stream were as follows:

| Constituent | Mole % |
| --- | --- |
| Methane | 22.4 |
| Ethane | 11.1 |
| Ethylene | 12.5 |
| Propane | 49.6 |
| Propylene | 3.0 |
| Isobutane | 1.4 |

The high activity of this zeolite composition ($K_\alpha = 237$) and the conversion product species indicate that the materials of this invention can be advantageously employed as catalysts or catalyst bases in hydrocarbon conversion reactions generally. The novel zeolites of this invention can be compounded into a porous inorganic matrix such as silica-alumina, silica-magnesia, silicazirconia, silica-aluminia-thoria, silica-alumina-magnesia and the like. The relative proportions of finely divided zeolite and inorganic matrix can vary widely with the zeolite content ranging from about 1 to 90 percent by weight, preferably from about 2 to about 50 percent by weight.

Among the hydrocarbon conversion reactions catalyzed by these new compositions are cracking, hydrocracking, isomerization including xylene isomerization, polymerization, reforming, oxygenate synthesis, hydrogenation, dehydrogenation, transalkylation and dealkylation, and catalytic dewaxing.

Using these zeolite catalyst compositions which contain a hydrogenation promoter such as platinum or palladium, heavy petroleum residual stocks, cyclic stocks and other hydrocrackable charge stocks can be hydrocracked at temperatures in the range of 400° F. to 825° F. using molar ratios of hydrogen to hydrocarbon in the range of between 2 and 80, pressures between 10 and 3500 p.s.i.g., and a liquid hourly space velocity (LHSV) of from 0.1 to 20, preferably 1.0 to 10.

The catalyst compositions employed in hydrocracking are also suitable for use in reforming processes in which the hydrocarbon feedstocks contact the catalyst at temperatures of from about 700° F. to 1000° F., hydrogen pressures of from 100 to 500 p.s.i.g., LHSV values in the range of 0.1 to 10 and hydrogen to hydrocarbon molar ratios in the range of 1 to 20, preferably between 4 and 12.

These same catalysts, i.e., those containing hydrogenation promoters, are also useful in hydroisomerization processes in which feedstocks such as normal paraffins are converted to saturated branched chain isomers. Hydroisomerization is carried out at a temperature of from about 200° F. to 600° F., preferably 300° F to 550° F. with an LHSV value of from about 0.2 to 1.0. Hydrogen is supplied to the reactor in admixture with the hydrocarbon feedstock in molar proportions (H/Hc) of between 1 and 5.

At somewhat higher temperatures, i.e., from about 650° F. to 1000° F., preferably 850° F. to 950° F. and usually at somewhat lower pressures within the range of about 15 to 50 p.s.i.g., the same catalyst compositions are used to hydroisomerize normal paraffins. Preferably the paraffin feedstock comprises normal paraffins having a carbon number range of $C_7$-$C_{20}$. Contact time between the feedstock and the catalyst is generally relatively short to avoid undesirable side reactions such as olefin polymerization and paraffin cracking. LHSV values in the range of 0.1 to 10, preferably 1.0 to 6.0, are suitable.

The increase in the molar $SiO_2/Al_2O_3$ ratios of the present zeolite compositions favor their use as catalysts in the conversion of alkylaromatic compounds, particularly the catalytic disproportionation of toluene, ethylene, trimethylbenzenes, tetramethylbenzenes and the like. In the disproportionation process isomerization and catalyst form employed contains less than 1.0 weight percent sodium as $Na_2O$ and is principally in the so-called hydrogen cation or decationized form. Group VIII noble metal adjuvents alone or in conjunction with Group VI-B metals such as tungsten, molybdenum and chromium are preferably included in the catalyst composition in amounts of from about 3 to 15 weight percent of the overall composition. Extraneous hydrogen can, but need not, be present in the reaction zone which is maintained at a temperature of from about 400° to 750° F., pressures in the range of 100 to 2000 p.s.i.g. and LHSV values in the range of 0.1 to 15.

Catalytic cracking processes are preferably carried out using those zeolites of this invention which have $SiO_2/Al_2O_3$ molar ratios of 8 to 12, less than 1.0 weight percent $Na_2O$ and feedstocks such as gas oils, heavy naphthas, deasphalted crude oil residua, etc., with gasoline being the principal desired product. The decationized form of the zeolite and/or polyvalent metal cationic form are advantageously employed. Temperature conditions of 850° to 1100° F., LHSV values of 0.5 to 10 and pressure conditions of from about 0 to 50 p.s.i.g. are suitable.

Dehydrocyclization reactions employing paraffinic hydrocarbon feedstocks, preferably normal paraffins having more than 6 carbon atoms, to form benzene, xylenes, toluene and the like, are carried out using essentially the same reaction conditions as for catalytic cracking. The preferred form of the zeolite employed as the catalyst is that in which the cations are principally metals of Group II-A and/or II-B, such as calcium, strontium, magnesium. Group VIII non-noble metal cations such as cobalt and nickel can also be employed.

In catalytic dealkylation wherein it is desired to cleave paraffinic side chains from aromatic nuclei without substantially hydrogenating the ring structure, relatively high temperatures in the range of about 800°–1000° F. are employed at moderate hydrogen pressures of about 300–1000 p.s.i.g., other conditions being similar to those described above for catalytic hydrocracking. Preferred catalysts are of the relatively non-acidic type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary, but not the only, objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like, any of which may contain up to about 5 weight percent of sulfur and up to about 3 weight percent of nitrogen.

Similar conditions can be employed to effect hydrofining, i.e., denitrogenation and desulfurization, of hydrocarbon feeds containing substantial proportions of organonitrogen and organosulfur compounds. As observed by D. A. Young in U.S. Pat. No. 3,783,123, it is generally recognized that the presence of substantial amounts of such constituents markedly inhibits the activity of catalysts for hydrocracking. Consequently, it is necessary to operate at more extreme conditions when it is desired to obtain the same degree of hydrocracking conversion per pass on a relatively nitrogenous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks, in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volume percent of fresh feed per pass, might be the same as those preferred for hydrocracking another feedstock having a lower concentration of hydrocracking inhibiting constituents, e.g., organonitrogen compounds. Consequently, it has become the practice in this art to establish the conditions under which a certain feed is to be contacted on the basis of preliminary screening tests with the specific catalyst and feedstocks.

Isomerization reactions are carried out under conditions similar to those described above for reforming, using somewhat more acidic catalysts. Olefins are preferably isomerized at temperatures of 500°–900° F., while paraffins, naphthenes and alkyl aromatics are isomerized at temperatures of 700°–1000° F. Particularly desirable isomerization reactions contemplated herein include the conversion of n-heptane and/or n-octane to isoheptanes, iso-octanes, butane to iso-butane, methylcyclopentane to cyclohexane, meta-xylene and/or ortho-xylene to paraxylene, 1-butene to 2-butene and/or isobutene, n-hexene to isohexene, cyclohexene to methyl-cyclopentene, etc. The preferred cation form of the zeolite catalyst is that in which the ion exchange capacity is about 50–60 percent occupied by polyvalent metals such as Group II-A, the cation sites are either decationized or occupied by hydrogen cations.

For alkylation and dealkylation processes the polyvalent metal cation form of the zeolite catalyst is preferred with less than 10 equivalent percent of the cations being alkali metal. When employed for dealkylation of alkyl aromatics, the temperature is usually at least 350° F. and ranges up to a temperature at which substantial cracking of the feedstock or conversion products occurs, generally up to about 700° F. The temperature is preferably at least 450° F. and not greater than the critical temperature of the compound undergoing dealkylation. Pressure conditions are applied to retain at least the aromatic feed in the liquid state. For alkylation the temperature can be as low as 250° F., but is preferably at least 350° F. In alkylating benzene, toluene and xylene, the preferred alkylating agents are olefins such as ethylene and propylene.

What is claimed is:

1. Hydrocarbon conversion process which comprises contacting a hydrocarbon feedstock under hydrocarbon conversion conditions with a zeolite composition having a chemical composition in the anhydrous state expressed in terms of molar oxide ratios $$aM_{2/n}O : Al_2O_3 : b\ SiO_2$$

wherein "a" has a value of from zero to about 1.2, "M" represents a cation having the valence of "n," and "b" has a value of at least 7, an x-ray diffraction pattern having at least the following d-spacings

| d, (Å) | Relative Intensity |
|---|---|
| 9.1 ± 0.2 | VS |
| 7.9 ± 0.2 | M |
| 6.9 ± 0.2 | M-S |
| 5.95 ± 0.1 | M-S |
| 4.69 ± 0.1 | M-S |
| 3.79 ± 0.1 | S |
| 3.62 ± 0.05 | M-S |
| 3.51 ± 0.05 | M-S |
| 3.14 ± 0.05 | M-S |
| 3.08 ± 0.05 | M |
| 3.03 ± 0.05 | M |
| 2.92 ± 0.05 | M-S | a B-E-T nitrogen surface area of at least 500 m²/g, an adsorption capacity for $SF_6$ of at least 6.0 weight percent when measured at 22° C. and an $SF_6$ pressure of 400 mm. Hg, and an adsorption capacity for oxygen of at least 20 weight percent when measured at −183° C. and an oxygen pressure of 100 mm. Hg.

2. Process according to claim 1 wherein the hydrocarbon conversion process is hydrocracking.

3. Process according to claim 1 wherein the hydrocarbon conversion process is catalytic cracking.

4. Process according to claim 1 wherein the hydrocarbon conversion process is reforming.

5. Process according to claim 1 wherein the hydrocarbon conversion process is alkylation.

6. Process according to claim 1 wherein the hydrocarbon conversion process is isomerization.

7. Process according to claim 1 wherein the hydrocarbon conversion process is hydrofining.

* * * * *